United States Patent [19]

Kobayashi et al.

[11] Patent Number: 4,500,447
[45] Date of Patent: Feb. 19, 1985

[54] ELECTRICALLY CONDUCTIVE SILICONE RUBBER COMPOSITIONS

[75] Inventors: Hideki Kobayashi, Ichihara; Mitsuo Hamada, Kisarazu, both of Japan

[73] Assignee: Toray Silicone Company, Inc., Tokyo, Japan

[21] Appl. No.: 527,522

[22] Filed: Aug. 29, 1983

[30] Foreign Application Priority Data

Sep. 8, 1982 [JP] Japan ................................ 57-156123

[51] Int. Cl.$^3$ .............................................. H01B 1/06
[52] U.S. Cl. ..................................................... 252/511
[58] Field of Search ................. 252/511, 502; 524/495, 524/496, 506, 500, 492, 588; 525/102, 100, 104, 105, 106

[56] References Cited

U.S. PATENT DOCUMENTS

| | | | |
|---|---|---|---|
| 4,051,454 | 9/1977 | Leiser et al. | 252/511 |
| 4,145,317 | 3/1979 | Sado et al. | 252/511 |
| 4,273,697 | 6/1981 | Sumimura et al. | 252/511 |
| 4,387,046 | 6/1983 | Marsch et al. | 524/495 |
| 4,433,096 | 2/1984 | Bokerman et al. | 524/495 |

*Primary Examiner*—Josephine L. Barr
*Attorney, Agent, or Firm*—Robert Spector

[57] ABSTRACT

Cured electrically conductive silicone rubber products exhibiting bleed-out of a silicone oil at a controlled rate are prepared from compositions containing carbon black and a curable polyorganosiloxane wherein 90 mol % of the silicon-bonded hydrocarbon groups are methyl. The silicone oil is a liquid polyorganosiloxane containing at least 1 mol %, based on the total number of hydrocarbon radicals present in said silicone oil, of silicon-bonded halogenated hydrocarbon radicals and the silicone oil is incompatible with the cured silicone rubber product.

14 Claims, No Drawings

ELECTRICALLY CONDUCTIVE SILICONE RUBBER COMPOSITIONS

BACKGROUND OF THE INVENTION

1. Field of the Invention

This invention relates to electrically conductive silicone rubber compositions. More particularly, this invention relates to curable, electrically conductive silicone rubber compositions which upon curing are characterized by the bleeding out at an appropriate rate of a specified silicone oil at the surface of the cured compositions.

2. Description of the Prior Art

Conventional silicone rubber molded products which have been coated, impregnated, or blended with a polydimethylsiloxane oil or a polymethylphenylsiloxane oil and which do not contain carbon black exhibit the thermal, chemical, and cold resistance and low compression set of the silicone rubber itself, in addition to an excellent releasability due to the bleeding-out of the silicone oil on the surface of the cured molded product. For this reason, such products are used in a wide variety of applications such as sealants, gaskets, boots, connectors, lamination rolls, expander rolls, textile-printing rolls, and heat-fixer rolls. In particular, molded silicone rubber products which have been impregnated or blended with a silicone oil will bleed out a constant quantity of silicone oil and can be simply and inexpensively manufactured. This is an advantageous situation.

However, an electrically conductive silicone rubber containing carbon black and one of the aforementioned silicone oils will not bleed out the silicone oil on the surface of the molded silicone rubber. Various methods were examined by the present inventors in order to remedy this shortcoming.

SUMMARY OF THE INVENTION

It has now been discovered that silicone oil will bleed out at a controlled rate on the surface of a cured, electrically conductive silicone rubber containing carbon black if the curable composition is blended with a silicone oil containing at least one halogenated hydrocarbon radical bonded to a silicon atom.

DETAILED DESCRIPTION OF THE INVENTION

This invention provides a curable, electrically conductive silicone rubber composition comprising (A) 100 parts by weight of a polyorganosiloxane having a viscosity of at least 0.1 mm²/s at 25° C. and an average unit formula $R_aSiO_{(4-a)/2}$, where R represents a monovalent hydrocarbon radical and a has a value of from 1.95 to 2.05, with the proviso that at least 90 mol % of the R groups are methyl; (B) 0 to 100 parts by weight of a finely divided silica filler; (C) 5 to 100 parts by weight of an electrically conductive carbon black; (D) 1 to 100 parts by weight of an incompatible polyorganosiloxane having a viscosity of from 0.01 to 10 mm²/s at 25° C. and an average unit formula

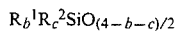

where $R^1$ is selected from the same group as R, $R^2$ represents a halogenated hydrocarbon radical, b is from 1 to 3, inclusive, c is from 0.001 to 1, inclusive, and the sum of b and c is from 1.95 to 2.05, inclusive, and where said incompatible polyorganosiloxane bleeds out at a controlled rate from the surface of the cured silicone rubber composition; and (E) 0.1 to 10 parts by weight of a curing agent for (A) selected from the group consisting of organoperoxides and combinations of a polyorganohydrogensiloxane, a polyorganosiloxane (A) containing alkenyl radicals and an amount of a platinum-containing catalyst sufficient to cure said composition.

The polyorganosiloxane comprising component (A) of the present compositions is a straight-chain or slightly branched straight-chain polymer having an average unit formula $R_aSiO_{(4-a)/2}$ where R represents a monovalent hydrocarbon radical or a 2-cyanoethyl radical and a is from 1.95 to 2.05. Typical R radicals include methyl, ethyl, propyl, octyl, vinyl, allyl, phenyl, and 2-cyanoethyl. At least 90 mol % of the R radicals are methyl. The viscosity of (A) is from 0.1 mm²/s up to and including viscosities characteristic of polymer gums. When the viscosity of (A) is less than 0.1 mm²/s at 25° C., the cured molded product will be hard and brittle. The preferred viscosity range for (A) is from 1 to 10,000 mm²/s at 25° C. In those instances when (A) is cured by an addition reaction in the presence of a polyorganohydrogensiloxane curing agent as component (E) and a platinum-containing material as the catalyst, each molecule of component (A) must possess at least 2 alkenyl radicals. Component (A) can be a single polymer, a copolymer, or a mixture of several polymers and/or copolymers. The terminal groups of component (A) include triorganosilyl groups such as trimethylsilyl, dimethylvinylsilyl, and methylphenylvinylsilyl groups, silanol groups, and alkoxy groups.

The finely divided silica filler comprising component (B) is an optional ingredient of the composition, however it is desirably present to provide the cured silicone rubber with hardness and strength. Component (B) can include any of the silica fillers conventionally used for silicone rubbers. Examples of silica fillers are fumed silica, precipitated silica, fine quartz powder, and diatomaceous earth. The filler should be finely divided and typically exhibits an average particle size no greater than 50μ and a specific surface area of at least 100 m²g. The filler surface may optionally be treated with organosilicon compounds such as organosilanes, low molecular weight organosiloxanes, and organosilazanes. When the amount of filler exceeds the amount of component (A), the workability of the composition decreases to the extent that the cured silicone rubber exhibits relatively poor mechanical properties. The quantity of component (B) should therefore be from 0 to 100 parts by weight per 100 parts by weight of component (A).

The electrically conductive carbon black of component (C) can be any of the carbon blacks conventionally used in electrically conductive rubbers. Specific examples include conductive furnace black, super-conductive furnace black, extra-conductive furnace black, conductive channel black, acetylene black, and furnace and channel blacks which have been heat-treated at elevated temperatures of about 1500° C. Conductive furnace blacks include Continex CF (from Continental Carbon Co.) and Vulcan C (from Cabot Co.). Super-conductive furnace blacks include Continex SCF (from Continental Carbon Co.) and Vulcan SC (from Cabot Co.). Extra-conductive furnace blacks include Asahi HS-500 (from Asahi Carbon Co., Ltd.) and Vulcan XC-72 (from Cabot Co.). Ketjen Black EC (from Lion-Akzo Co.) can be used as a furnace black. An example of a conductive channel black is Corax L (from Degussa Co.) and an example of an acetylene black is Denka Acetylene Black (from Denki Chemical Ind. Co., Ltd.).

The quantity of component (C) is from 5 to 150 parts by weight per 100 parts by weight of component (A). When this quantity is less than 5 parts by weight, the conductivity of the cured composition is inadequate. When the quantity of carbon black exceeds 150 parts by weight, blending becomes difficult and the composition becomes hard, resulting in a significant decline in molding productivity.

The polyorganosiloxane comprising component (D) of the present composition is critical in that it will bleed out at a controlled rate on the surface of the cured silicone rubber molding. Component (D) should therefore be incompatible with the cured composition.

Component (D) exhibits a viscosity of from 0.01 to 10 mm$^2$/s at 25° C. and an average unit formula of $$R_b^1 R_c^2 SiO_{(4-b-c)/2}$$

wherein $R^1$ represents a monovalent hydrocarbon radical or a 2-cyanoethyl radical, $R^2$ represents a halogenated hydrocarbon radical, b is from 1 to 3, inclusive, c is from 0.001 to 1, inclusive, and the sum of b and c is from 1.95 to 2.05, inclusive.

Component (D) is a straight chain fluid which can have a small degree of branching. Nonbranched fluids are preferred. The hydrocarbon radical represented by $R^1$ is selected from the same group defined hereinbefore for R. All of the $R^1$ radicals are preferably methyl or a combination of methyl and phenyl.

The halogen substituent of the $R^2$ radical is typically at least one of chlorine, fluorine, and bromine, with chlorine or fluorine being preferred. The type of hydrocarbon radical that is substituted with the halogen is not critical, however, it is typically alkyl containing from 1 to 10 carbon atoms, phenyl, or aralkyl. The location of the halogen substitution on a hydrocarbon radical is arbitrary and can be anywhere on the radical. The degree of halogen substitution can be from 1 to all of the hydrogen atoms present on an $R^2$ radical. Specific examples of $R^2$, include chloromethyl, fluoromethyl, chloroethyl, fluoroethyl, chloropropyl, fluoropropyl, bromopropyl, 3,3-dichloropropyl, 3,3-difluoropropyl, 3,3,3-trichloropropyl, 3,3,3-tribromopropyl, 3,3,3-trifluoropropyl, 4,4,4,3,3,-pentafluoropropyl, chlorophenyl, fluorophenyl, bromophenyl, and chlorophenylethyl.

At least 1 $R^2$ radical must be present in each molecule of component (D). Preferably the $R^2$ content is at least 1 mol %, based on the total number of $R^1$ and $R^2$ radicals. $R^2$ may be a single type of halogenated hydrocarbon radical or 2 or more different types. Typical terminal groups for component (D) include trimethylsilyl, dimethylphenyl, triorganosilyl in which one of the organic groups is $R^2$, silanol groups, and alkoxy groups.

Component (D) differs from a dimethylsilicone oil or methylphenylsilicone oil by the presence of the highly polar radical represented by $R^2$. It therefore exhibits a poor affinity for the conductive carbon black and other ingredients present in the cured composition, and can therefore bleed out of the cured composition. When the viscosity of component (D) at 25° C. is less than 0.01 mm$^2$/s, it bleeds out too rapidly and does not exhibit adequate lubrication on the cured silicone rubber surface. On the other hand, component (D) bleeds out too slowly when its viscosity is equal to or greater than 10 mm$^2$/s. For this reason, the viscosity should be from 0.01 to 10 mm$^2$/s and preferably from 0.05 to 5 mm$^2$s.

When the concentration of component (D) in a composition is less than 1 part by weight per 100 parts by weight of component (A), the amount of bleed will be inadequate. On the other hand, when this quantity exceeds 100 parts by weight, the cured silicone rubber will not exhibit adequate strength. For this reason, the concentration of (D) should be from 1 to 100 parts by weight and preferably from 2 to 60 parts by weight per 100 parts of component (A). Component (D) is blended with components (A), (B), (C), and (E) during preparation of the present curable compositions.

The curing agent, component (E), is an organoperoxide or a polyorganohydrogensiloxane, depending on the curing method to be employed for the composition. The organoperoxides include di-t-butylperoxide, 2,5-dimethyl-2,5-di(t-butylperoxy)hexane, and dicumyl peroxide, which are all conventionally known curing agents for silicone rubber compositions.

When a polyorganohydrogensiloxane is used as the curing agent, a platinum-type compound is necessarily employed as the addition-reaction catalyst, and alkenyl radicals must be present in component (A). In order to cure the composition adequately, each molecule of component (A) must possess at least 2 alkenyl radicals, each molecule of the polyorganohydrogensiloxane must possess at least 2 SiH groups, and the sum of the number of alkenyl radicals in each molecule of component (A) and the number of SiH groups in each molecule of component (E) must be at least 5.

Typical polyorganohydrogensiloxanes include polymethylhydrogensiloxane, tetramethyltetrahydrogencyclotetrasiloxane, and copolymers containing methylhydrogensiloxane and dimethylsiloxane units; however, these examples are not limiting. Silicon-bonded phenyl and alkyl groups other than methyl may be present. The degree of polymerization ranges from 2 up to the maximum possible degree of polymerization for the polysiloxane.

Examples of platinum-type compounds used in combination with polyorganohydrogensiloxanes include chloroplatinic acid, alcohol-modified chloroplatinic acid, platinum-olefin or platinum-vinylsiloxane complexes, fine platinum powder adsorbed on a support such as alumina or silica, palladium catalysts, and rhodium catalysts. A platinum compound is preferred. The quantity of platinum-type compound to be used should be both economical and adequate to cure the composition, and is generally from 1 to 1000 ppm by weight platinum based on the weight of component (A).

The amount of organoperoxide or polyorganohydrogensiloxane required to adequately cure the present compositions is typically from 0.1 to 10 parts by weight per 100 parts by weight of component (A).

In addition to the above-mentioned components (A)–(E), the curable compositions of this invention can contain optional additives typically employed in curable silicone rubber compositions. These additives include carbon fibers, graphite, metal powder, metal fibers, thermal stabilizers, flame retardants, and pigments, and can be added as required to the compositions of this invention.

The final curable composition can be produced by kneading the aforementioned components (A)–(E) and any other ingredients using a device such as a roll, kneader, or Banbury mixer. At this time, the composition is heat-treated or aged as required.

The present curable compositions are molded by conventional methods using a compression molder, injection molder, transfer molder, or extrusion molder in order to obtain a cured electrically conductive silicone rubber molded product which will bleed out a silicone oil (component D). This electrically conductive silicone rubber molded product will exhibit oil bleed-out in addition to its original conductivity and antistatic properties, with the result that the surface of the molded product exhibits an excellent releasability even though it is not provided with or coated with a rubber surface lubricant. For this reason, this silicone rubber molded product is easily removed when employed as a sealant gasket, boot, or connector. When this silicone rubber molded product is used as a lamination roll or heat-fixing roll, roll surface soiling by tacky substances is suppressed.

This invention will be explained using the following demonstrational examples. "Part" in the examples means "part by weight" and viscosities were measured at 25° C.

Co., Ltd.) and, the composite was placed under a pressure of 0.29 megapascals for 48 hours. The silicone oil that bled out was absorbed by the filter paper. The paper was weighed prior to and following the evaluation, and the difference in weight is reported in Table 1.

COMPARISON EXAMPLES 5 AND 6

In the comparison examples, silicone rubber molded products were manufactured by the method of Examples 1-4 with the exception that component (D) was replaced with either 40 parts of a trimethylsilyl-terminated polydimethylsiloxane exhibiting a viscosity of 0.1 mm$^2$/s or 40 parts of a trimethylsilyl-terminated methylphenylpolysiloxane exhibiting a viscosity of 0.1 mm$^2$/s. The polymer contained 90 mol % of dimethylsiloxane units and 10 mol % of methylphenylsiloxane units. The physical properties and oil bleed were measured using the aforementioned methods and the results are reported in Table 1. The results of the oil bleed tests demonstrate that the compositions of this invention exhibited an excellent oil bleed-out while the comparison examples did not exhibit any oil bleed-out.

TABLE 1

| Component (D) or Comparative Polyorganosiloxane | This Invention | | | | Comparison Examples | |
|---|---|---|---|---|---|---|
| | 1 | 2 | 3 | 4 | 5 | 6 |
| Poly(3,3,3-trifluoropropyl)-methylsiloxane (parts) | 2 | 10 | 40 | | | |
| Poly(3-chloropropyl)-methylsilaxane (parts) | | | | 40 | | |
| Polydimethylsiloxane (parts) | | | | | 40 | |
| Polymethylphenylsiloxane (parts) | | | | | | 40 |
| Properties | | | | | | |
| Hardness (JIS-A) | 60 | 56 | 30 | 30 | 31 | 32 |
| Tensile Strength (MPa) | 5.6 | 5.2 | 4.1 | 4.3 | 3.9 | 4.0 |
| Elongation at break (%) | 250 | 210 | 270 | 260 | 250 | 250 |
| Volume resistivity (ohm-cm) | 10 | 13 | 15 | 15 | 16 | 18 |
| Oil Bleed-out (g) | 0.03 | 0.08 | 0.11 | 0.09 | 0 | 0 |

EXAMPLES 1-4

A curable composition was prepared by blending together 100 parts of a dimethylvinylsiloxy endblocked polyorganosiloxane gum exhibiting a viscosity of about 10,000 mm$^2$/s and containing 99.8 mol % dimethylsiloxane units and 0.2 mol % methylvinylsiloxane units, 40 parts of a conductive acetylene black available as Denka Black from Denki Chemical Ind. Co., Ltd., 5 parts of fumed silica exhibiting a surface area of 200 m$^2$/g available as Aerosil 200 from Nihon Aerosil Co., Ltd., and as component (D), 2, 10, or 40 parts of a trimethylsilyl-terminated poly(3,3,3-trifluoropropyl)methylsiloxane exhibiting a viscosity of 0.1 mm$^2$/s or 40 parts of a trimethylsilyl-terminated poly(3-chloropropyl)methylsiloxane exhibiting a viscosity of 1 mm$^2$/s. The resulting mixture was then combined with 1.0 part of 2,5-dimethyl-2,5-di(t-butylperoxy)hexane and subsequently molded at 170° C. under a pressure of 4.9 megapascals for 10 minutes to obtain a silicone rubber molded product. The product was in the form of either a 220×120×2 mm sheet for physical property measurements or a right cylinder having a diameter of 29.0 mm and a height of 12.7 mm for measurement of oil bleed. Physical properties were measured in accordance with the methods of JIS-K 6301 and the oil bleed was measured using the following procedure:

The aforementioned right cylindrical silicone rubber molding was placed between two sheets of filter paper (No. 7 for quantitative analysis from Toyo Filter Paper

EXAMPLES 7-10

Curable compositions of this invention were prepared by combining 100 parts of a dimethylvinylsiloxy terminated polydimethylsiloxane exhibiting a viscosity of 2 mm$^2$/s, 15 parts of a conductive furnace black, available as Ketjen Black EC from Lion-Akzo Co., Ltd., 10 parts of fumed silica described in Example 1, and the two component (D) siloxanes of Example 1-4 in the amounts shown in the accompanying Table 2. The resulting mixtures were kneaded to homogeneity together with 0.4 part of a trimethylsiloxy-terminated dimethylsiloxane/methylhydrogensiloxane copolymer containing 50 mol % of each repeating unit and exhibiting a viscosity of 0.01 mm$^2$/s, 0.1 part of an isopropanol solution containing 0.3 wt. % platinum, and 0.02 part of methylbutynol. The resultant mixture was molded at 120° C. under a pressure of 30 kg/cm$^2$ for 1 minute to obtain silicone rubber moldings identical in dimensions to those of Examples 1-4. The properties of the moldings were measured using the methods of Example 1-4, and the results are reported in Table 2.

COMPARISON EXAMPLES 11 AND 12

Cured samples were prepared using the polydimethylsiloxane or the polymethylphenylsiloxane of Examples 5 and 6 in place of component (D). The results of the evaluation of these samples are also reported in Table 2.

TABLE 2

| Component (D) or Comparative Polyorganosiloxane | Example No. This Invention | | | | Comparison Examples | |
|---|---|---|---|---|---|---|
| | 7 | 8 | 9 | 10 | 11 | 12 |
| Poly(3,3,3-trifluoropropyl)methylsiloxane (parts) | 50 | | | | | |
| Poly(3-chloropropyl)methylsiloxane (parts) | | 5 | 20 | 50 | | |
| Polydimethylsiloxane (parts) | | | | | 50 | |
| Polymethylphenylsiloxane (parts) | | | | | | 50 |
| Properties | | | | | | |
| Hardness (JIS-A) | 44 | 65 | 58 | 45 | 46 | 46 |
| Tensile Strength (MPa) | 3.9 | 4.9 | 4.6 | 4.1 | 4.7 | 4.6 |
| Elongation at break (%) | 300 | 270 | 270 | 290 | 280 | 280 |
| Volume resistivity (ohm-cm) | 70 | 30 | 40 | 60 | 60 | 70 |
| Oil Bleed-out (g) | 0.12 | 0.03 | 0.06 | 0.10 | 0 | 0 |

EXAMPLE 13

A curable composition was prepared by blending together 100 parts of a dimethylvinylsiloxy endblocked polyorganosiloxane gum exhibiting a viscosity of about 10,000 mm$^2$/s at 25° C. and containing 96.5 mol % dimethylsiloxane units, 0.5 mol % methylvinylsiloxane units and 3 mol % methylphenylsiloxane units, 45 parts of the acetylene black of Examples 1–4, 5 parts of the fumed silica of Example 1–4, and, as component D, 40 parts of a trimethylsiloxy-terminated organosiloxane copolymer exhibiting a viscosity of 3.5 mm$^2$/s and containing 90 mol % dimethylsiloxane units and 10 mol % 3,3,3-trifluoropropylmethylsiloxane units. The resulting mixture was combined with 1.0 part of 2,5-dimethyl-2,5(di-t-butylperoxy)hexane and then molded into a right cylinder exhibiting a diameter of 29.0 mm. and a height of 12.7 mm. using the conditions of Examples 1–4. The oil bleed-out of the cured sample was 0.04 g.

COMPARISON EXAMPLE 14

A right cylindrical test sample of the same dimensions disclosed in Example 13 was prepared using a composition identical to the one described in Example 13, with the exception that component (D) was replaced with 40 parts of a trimethylsiloxy-terminated polydimethylsiloxane exhibiting a viscosity of 3 mm$^2$/s. This sample did not exhibit any oil bleed-out.

That which is claimed is:

1. A curable, electrically conductive silicone rubber composition comprising
   (A) 100 parts by weight of a polyorganosiloxane having a viscosity of at least 0.1 mm$^2$/s and an average unit formula $R_aSiO_{4-a/2}$, where R represents a monovalent hydrocarbon radical or a 2-cyanoethyl radical, a has a value of from 1.95 to 2.05, and at least 90 mol % of the R radicals are methyl;
   (B) 0 to 100 parts by weight of a finely divided silica filler;
   (C) 5 to 100 parts by weight of an electrically conductive carbon black;
   (D) 1 to 100 parts by weight of an incompatible polyorganosiloxane having a viscosity of from 0.01 to 10 mm$^2$/s at 25° C. and an average unit formula $R_b^1 R_c^2 SiO_{(4-b-c)/2}$, where $R^1$ is selected from the same group as R, $R^2$ represents a halogenated hydrocarbon radical, b is from 1 to 3 inclusive, c is from 0.001 to 1 inclusive, the sum of b and c is from 1.95 to 2.95 inclusive and where said incompatible polyorganosiloxane bleeds out at a controlled rate from the surface of said silicone rubber composition following curing of said composition;
   (E) 0.1 to 10 parts by weight of a curing agent for (A), said curing agent being selected from the group consisting of organoperoxides and combinations of a polyorganohydrogensiloxane, a polyorganosiloxane (A) containing alkenyl radicals and an amount of a platinum-containing catalyst sufficient to cure said composition.

2. A curable composition according to claim 1 where the viscosity of (A) is from 1 to 1,000 mm$^2$/s at 25° C.

3. A curable composition according to claim 1 where the unit formula for (A) is $(CH_3)_2SiO$, a combination of 99.8 mol % $(CH_3)_2SiO$ and 0.2 mol % $(CH_3)(CH_2=CH)SiO$, or a combination of 96.5 mol % $(CH_3)_2SiO$, 0.5 mol % $(CH_3)(CH_2=CH)SiO$, and 3 mol % $(CH_3)(C_6H_5)SiO$.

4. A curable composition according to claim 1 where the halogen portion of the halogenated hydrocarbon radical represented by $R^2$ is chlorine, bromine, or fluorine.

5. A curable composition according to claim 4 where said halogen portion is chlorine or fluorine.

6. A curable composition according to claim 4 where $R^2$ is 3-chloropropyl or 3,3,3-trifluoropropyl.

7. A curable composition according to claim 1 where c is at least 0.01.

8. A curable composition according to claim 1 where $R^1$ is methyl.

9. A curable composition according to claim 1 where $R^2$ is a halogen-substituted radical selected from the group consisting of alkyl containing from 1 to 10 carbon atoms, phenyl, and aralkyl.

10. A curable composition according to claim 1 where the viscosity of (D) is from 0.05 to 5 mm$^2$/s.

11. A curable composition according to claim 1 where the concentration of (D) is from 2 to 60 parts by weight per 100 parts of (A).

12. A composition according to claim 1 where said silica filler is a fumed silica.

13. A composition according to claim 1 where said curing agent is 2,5-dimethyl-2,5-di(t-butylperoxy)hexane.

14. A composition according to claim 1 where said curing agent is a trimethylsiloxy-terminated polymethylhydrogensiloxane, each molecule of component (A) contains at least 2 alkenyl radicals, each molecule of said polymethylhydrogensiloxane contains at least 2 SiH groups, and the combination of said alkenyl radicals and SiH groups totals at least 5.

* * * * *